(12) United States Patent
Aarnio et al.

(10) Patent No.: US 7,606,559 B2
(45) Date of Patent: Oct. 20, 2009

(54) SYSTEM, AND ASSOCIATED TERMINAL, METHOD AND COMPUTER PROGRAM PRODUCT FOR FORWARDING CONTENT AND PROVIDING DIGITAL RIGHTS MANAGEMENT OF THE SAME

(75) Inventors: Ari Aarnio, Espoo (FI); Kenneth Paqvalén, Helsinki (FI); Ahti Muhonen, Hirvihaara (FI); Antti-Pentti Vainio, Espoo (FI); Ari Hännikäinen, Lempäälä (FI)

(73) Assignee: Nokia Corporation, Espoo (FI)

( * ) Notice: Subject to any disclaimer, the term of this patent is extended or adjusted under 35 U.S.C. 154(b) by 240 days.

(21) Appl. No.: 11/018,618

(22) Filed: Dec. 21, 2004

(65) Prior Publication Data

US 2006/0135127 A1    Jun. 22, 2006

(51) Int. Cl.
*H04M 1/66* (2006.01)
(52) U.S. Cl. .................. 455/411; 455/406; 455/410; 455/412.2; 455/414.1
(58) Field of Classification Search .................. 455/411, 455/412.1, 414.2
See application file for complete search history.

(56) References Cited

U.S. PATENT DOCUMENTS

| 6,226,618 | B1 | 5/2001 | Downs et al. |
| 2003/0028612 | A1* | 2/2003 | Lin et al. ..................... 709/217 |
| 2003/0078031 | A1* | 4/2003 | Masuda ....................... 455/406 |
| 2003/0161473 | A1 | 8/2003 | Fransdonk |
| 2003/0167392 | A1 | 9/2003 | Fransdonk |
| 2004/0166878 | A1* | 8/2004 | Erskine et al. ............ 455/456.1 |
| 2004/0179687 | A1* | 9/2004 | Lai et al. ..................... 380/247 |
| 2005/0075764 | A1* | 4/2005 | Horst et al. .................... 701/19 |
| 2005/0172122 | A1 | 8/2005 | Risan et al. |

FOREIGN PATENT DOCUMENTS

| WO | WO 01/98903 A1 | 12/2001 |
| WO | WO 03/096340 A2 | 11/2003 |

OTHER PUBLICATIONS

Benoit Macq, Jana Dittmann, Edward J. Delp;*Benchmarking of Image Watermarking Algorithms for Digital Rights Management*; Jun. 2004; pp. 971-984; vol. 92, No. 6; Proceedings of the IEEE; IEEE USA.

(Continued)

*Primary Examiner*—Alexander Eisen
*Assistant Examiner*—Dai A Phuong
(74) *Attorney, Agent, or Firm*—Alston & Bird LLP

(57) ABSTRACT

A system is provided for forwarding content. The system includes a terminal capable of sending a request to transfer content, the request being sent from a terminal over a first network such as a wireless or other high latency network, and over a second network such as a wireline or other low latency network. The system also includes a source capable of sending the content, and a destination capable of receiving the content, both over the second network independent of the first network to thereby transfer the content from the source to the destination. By transferring content independent of the first network, the system can transfer content without the latency that follows from transferring content over such a wireless or other high latency network. Digital rights management of content transferred from a source to a destination is also provided.

25 Claims, 9 Drawing Sheets

OTHER PUBLICATIONS

Mairead Martin, Grace Agnew, David L. Kuhlman, John H. McNair, William A. Rhodes, Ron Tipton; *Federated Digital Rights Management;*—A Proposed DRM Solution for Research and Education; Jul./Aug. 2002; 14 pages; vol. 8, No. 7-8; Corporation for National Research Initiatives; ISSN USA.

R.J. Lipton, S. Rajagopalan, D.N. Serpanos;*SPY: A Method to Secure Clients for Network Services*; Jul. 2002; 5 pages; Proceedings of the $22^{nd}$ International Conference on Distributed Computing Systems Workshops, IEEE Compt. Soc., Los Alamitos, CA; IEEE USA.

* cited by examiner

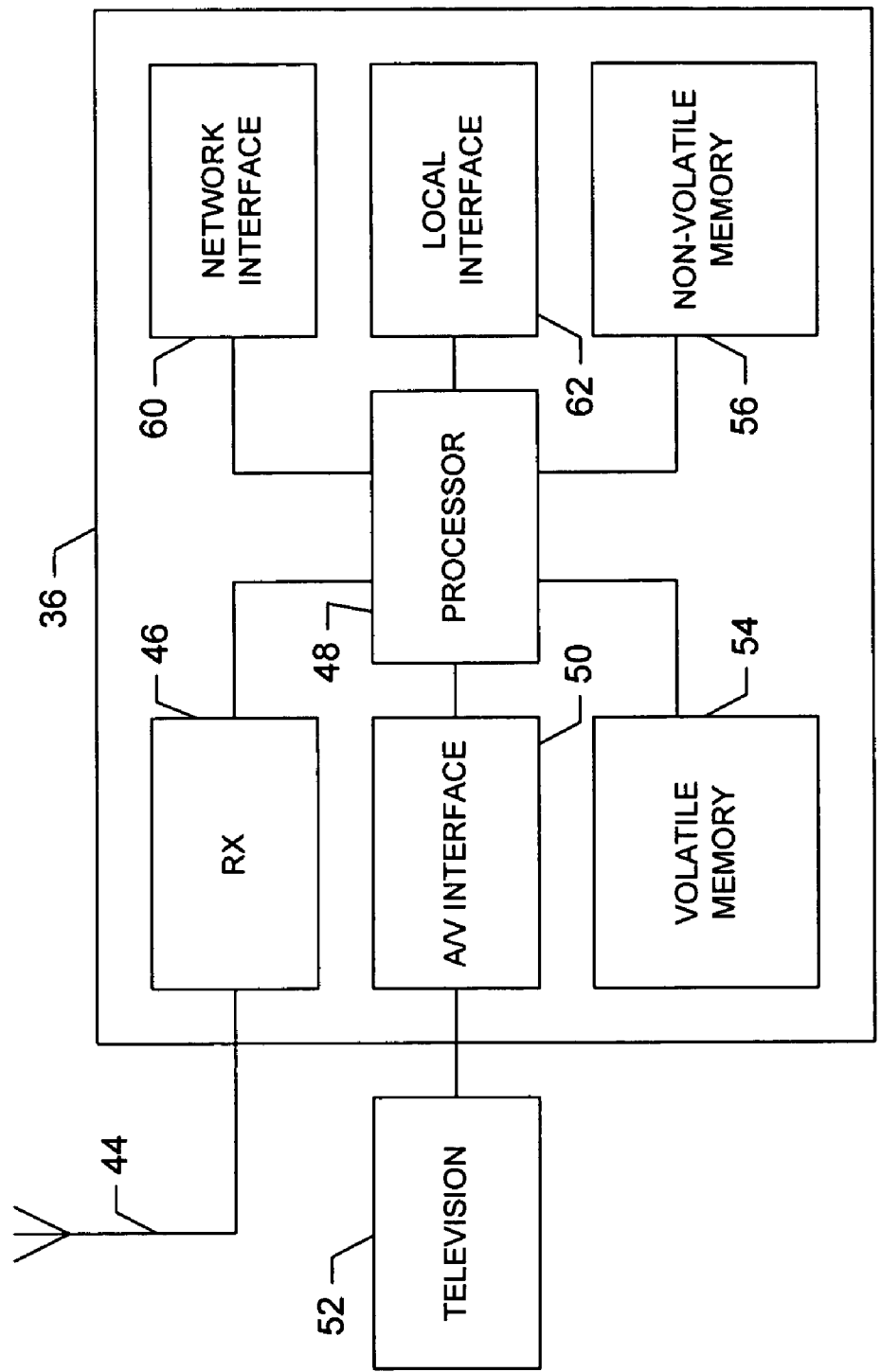

SYSTEM, AND ASSOCIATED TERMINAL, METHOD AND COMPUTER PROGRAM PRODUCT FOR FORWARDING CONTENT AND PROVIDING DIGITAL RIGHTS MANAGEMENT OF THE SAME

FIELD OF THE INVENTION

The present invention generally relates to systems and methods for transferring content and, more particularly, to systems and associated terminals, methods and computer program products for forwarding content and providing digital rights management of the same.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. The proliferation of local, regional, and global networks such as the Internet has availed a sea of information to society. These networking technologies have expanded to increasingly include wireless and mobile technologies. Through these networks, information can be downloaded to desktop systems, wireless systems, mobile systems, etc. For example, information available via the Internet can now be downloaded onto mobile wireless units, such as cellular telephones, personal digital assistants (PDAs), laptop computers, etc. One such technology facilitating the transfer of Internet content to and from wireless devices is the Wireless Application Protocol (WAP), which integrates the Internet and other networks with wireless network platforms. Generally, WAP is a set of protocols that accounts for characteristics and functionality of both Internet standards and standards for wireless services. It is independent of wireless network standards, and is designed as an open standard. WAP bridges the gap between the wireline Internet paradigm and the wireless domain, to allow wireless device users to enjoy the benefits of the Internet across both platforms.

Second generation wireless service, often referred to as 2G wireless service, is a current wireless service based on circuit-switched technology. In this regard, 2G systems, such as Global System for Mobile communications (GSM) and Personal Communications Services (PCS), use digital radio technology for improved quality and a broader range of services over first generation mobile technologies. Third generation wireless service, often referred to as 3G wireless service, refers to a set of digital technologies that promises improvements in capacity, speed and efficiency by deploying new packet-based transmission methodologies between terminals and the network. Users of 3G devices and networks will have access to multimedia services such as video-on-demand, video conferencing, fast web access and file transfer. Existing and future services are, and will continue to be, provided by network servers who make services and applications available to mobile device users via the network.

An incredible amount of content, applications, services, and the like is already available for use on wireless devices. However, the quantity of information that will be accessible to mobile terminals will increase significantly in the coming years, as further technological advances will continue to diminish the gap between desktop and wireless units. For example, the combination of mobile telecommunication and relatively very low cost digital broadband delivery techniques (e.g., DVB) provides the possibility of interactive services such as unidirectional and bi-directional services including as audio and video streaming (e.g., TV, radio, etc.), file downloads and advanced gaming applications, and the like.

While access to this plethora of information is exciting to the mobile world, storing the desired information and utilizing the various access techniques for transferring the desired information can become burdensome to the casual mobile terminal user. In this regard, the increase in the quantity of information that is and will be accessible to and/or stored by mobile terminals can place a heavy storage capacity burden on such mobile terminals. In mobile terminals that also operate as telecom devices, content storage is a particularly important issue since users expect sufficiently reasonable storage capacity for necessary communication purposes which they expect to be available.

To relieve at least a portion of the storage capacity burden on mobile terminals, techniques have been developed whereby mobile terminals are capable of transferring, or uploading, content from mobile terminals to servers or the like with increased storage capacity. As will be appreciated, however, such techniques can also have drawbacks. According to conventional uploading techniques, mobile terminals generally upload content at least partially over a wireless link. However, wireless links typically suffer from increased latency due to a narrow radio bandwidth, which is approximately 30 kilo-bits-per-second in General Packet Radio Services (GPRS) communication. Further, wireless links also typically suffer from increased latency due to a layer of the radio link that accounts for high bit error rates. In general, for example, wireless network communication in accordance with GPRS can have a latency of approximately one second, which can be up to 30-40 times longer than similar wireline links.

As with the transfer and use of content in accordance with other conventional techniques, including cellular communication techniques, local transfer techniques and/or messaging techniques, there are some challenges with the protection of such content. Generally, conventional content protection can have several dimensions. In this regard, content can be protected by securing access to content. In such instances, the content may be available from content sources. Access to the content sources, however, can be controlled through, for example, firewalls, virtual private networks (VPNs) or the like. In addition to, or in lieu of, protecting access to content, content itself can be encrypted using any of a number of different encryption techniques, such as public key infrastructure (PKI) techniques. Further, content can be protected by using authentication schemes, as such are well known to those skilled in the art.

Whereas such techniques are adequate in protecting content delivered from a content source to a terminal, such techniques typically do not protect the same content being transferred from the terminal to another device, such as to another terminal. In addition, such techniques typically do not facilitate compensating the creators of such content when the content is transferred or otherwise distributed. In this regard, such subsequent transfers of the content from the terminal can lead to losses to the content sources in the form of content piracy, particularly for pay content.

SUMMARY OF THE INVENTION

In light of the foregoing background, embodiments of the present invention provide a system, and associated terminal, method, computer program product and integrated circuit assembly for forwarding content and providing digital rights management of the content. In accordance with the system and associated terminal, method, computer program product and integrated circuit assembly of embodiments of the present invention, a terminal is capable of directing a source of content to upload one or more pieces of content from the source to a destination, or directing the destination to download, and thereafter store, the piece(s) of content from the source. Typically, the source and destination are capable of transferring the content in a manner such that the transfer can occur without the latency or expense that may follow transferring content over a wireless link. In this regard, the terminal can direct the source to upload, or the destination to download, piece(s) of content previously received by the terminal from the source. In such instances, the terminal can be capable of effectively offloading piece(s) of content stored by the terminal to memory of the destination, thereafter removing the content from memory of the terminal to thereby relieve at least a portion of the storage capacity burden on the terminal.

In addition, the system and associated terminal, method, computer program product and integrated circuit assembly can be capable of providing digital rights management of content transferred form a source to a destination. More particularly, embodiments of the present invention can be capable of verifying that the source and/or destination (and/or terminal directing the transfer) is authorized or otherwise has rights to the content before permitting the transfer of the content. To provide digital rights management, one or more sources and/or destinations are capable of being included within a digital rights service group defining a level of access of the source and/or destination to protected content. To facilitate granting the source and/or destination access to such protected content, where the respective source(s) and/or destination(s) are associated with a digital rights service group identifier that identifies the respective digital rights service group. Thus, before content is transferred or otherwise forwarded from a source to a destination, access rights of the source and/or destination (and/or terminal directing the transfer) can be verified.

According to one aspect of the present invention, a system is provided for forwarding content. The system includes a terminal capable of sending a request to transfer content, the request being sent from a terminal over a first network such as a wireless or other high latency network, and over a second network such as a wireline or other low latency network. The system also includes a source capable of sending the content, and a destination capable of receiving the content. In this regard, the source is capable of sending, and the destination capable of receiving, the content over the second network independent of the first network to thereby transfer the content from the source to the destination. By transferring content independent of the first network, the system can transfer content without the latency that follows from transferring content over such a wireless or other high latency network.

The terminal can be capable of receiving content before the request to transfer content, where the content is received from the source over the first network and the second network. In such instances, the terminal can be further capable of storing the content in a memory of the terminal after receiving the content. The terminal can then be capable of sending a request to transfer the same content from the source to the destination, and be capable of removing the content from the memory after the content is transferred from the source to the destination.

The system can also include an entity capable of monitoring the transfer of content from the source to the destination. As such, one or more creators of the content can be capable of receiving compensation based upon the transfer and/or a transfer frequency of the content.

The system can further include an authorizing entity. In such instances, the terminal can be capable of sending authorization information. The authorizing entity can therefore be capable of verifying an identity of the terminal and/or terminal user based upon the authorization information before the content is transferred. Before sending the authorization information, the terminal can be capable of encrypting the authorization information, where the encrypted authorization information includes a time stamp defining a period of time the authorization information is capable of being decrypted. In such instances, the authorizing entity can be capable of decrypting the authorization information within the period of time defined by the time stamp before verifying the identity of the terminal and/or terminal user.

The terminal, source and/or destination can be included within at least one digital rights service group, and correspondingly be associated with at least one digital rights service group identifier. In this regard, at least one digital rights service group identifier can define access to protected content available from a content origin, and at least one digital rights service group identifier can comprise a supplemental group identifier defining access to one or more specified piece(s) of content available from the same content origin or a different content origin.

In such instances, the system can include an authorizing entity capable of verifying access rights of the terminal, source and/or destination to the content based upon the digital rights service group identifier(s), or more particularly based upon a digital rights service group identifier and/or a supplemental group identifier. More particularly, the system can include a home location register (HLR) and/or a visitor location register (VLR) capable of storing at least one digital rights service group identifier. The authorizing entity can therefore be capable of communicating with at least one of the HLR and VLR to receive at least one digital rights service group identifier, and thereafter verify access rights based upon the received at least one digital rights service group identifier and the content. Irrespective of how the authorizing entity verifies access rights, thereafter the source can be capable of sending, and the destination capable of receiving, the content if the access rights of the terminal, source and/or destination are verified.

According to another aspect of the present invention, a system is presented for providing digital rights management of content. The system includes an entity, such as an authorizing entity or other entity (e.g., content origin), is capable of providing at least one digital rights service group including at least one source and/or at least one destination. For example, at least one digital rights service group can define access to protected content available from a content origin, and at least one digital rights service group can define access to one or more specified piece(s) of content available from the same content origin or a different content origin. Irrespective of the nature of the digital rights service groups, however, the entity is also capable of associating the source(s) and/or destination (s) with at least one digital rights service group identifier based upon the defined digital rights service group(s). In this regard, the entity can be capable of associating the source(s) and/or destination(s), included within the digital rights service group(s) defining access to one or more specified piece(s) of content, with supplemental group identifier(s).

By providing the digital rights serviced groups, and associating the identifiers with the source(s) and/or destination(s), access rights of the source and/or destination to content can be verified based upon the digital rights service group identifier, or more particularly a digital rights service group identifier and/or a supplemental group identifier. Thus, a transfer of the content from the source to the destination can be permitted if the access rights of at least one of the source and destination are verified. The system can further include a HLR and/or a VLR capable of storing at least one digital rights service group identifier. In such instances, at least one digital rights service group identifier can be received from at least one of the HLR and VLR such that access rights can be verified based upon the received at least one digital rights service group identifier and the content.

According to other aspects of the present invention, a terminal, method, computer program product and integrated circuit assembly are provided. Therefore, embodiments of the present invention provide a system and associated terminal, method, computer program product and integrated circuit assembly for forwarding content and providing digital rights management of the content. Embodiments of the present invention are capable of permitting a terminal to direct the transfer of content from a source to a destination, where the content can comprise that previously received and stored by the terminal. The terminal can thereafter remove the content from memory of the terminal, thereby effectively offloading piece(s) of content stored by the terminal to memory of the destination, without transferring the content from the terminal to the destination over a wireless or other high latency network.

In addition, embodiments of the present invention are capable of providing a digital rights management of content transferred form a source to a destination. By including the source and/or destination (and/or terminal directing the content transfer) within a digital rights service group, and associating the source and/or destination (and/or terminal) with respective identifier(s) stored in a HLR/VLR, an authorizing entity can communicate with the HLR/VLR to receive the identifier(s). Thereafter, the authorizing entity can verify that the source and/or destination (and/or terminal) is authorized or otherwise has rights to the content before permitting the transfer of the content, permitting the transfer of content if the source and/or destination (and/or terminal) is verified. Therefore, the system and associated terminal, method, computer program product and integrated circuit assembly of embodiments of the present invention solve the problems identified by prior techniques and provide additional advantages.

BRIEF DESCRIPTION OF THE DRAWINGS

Figure 1:
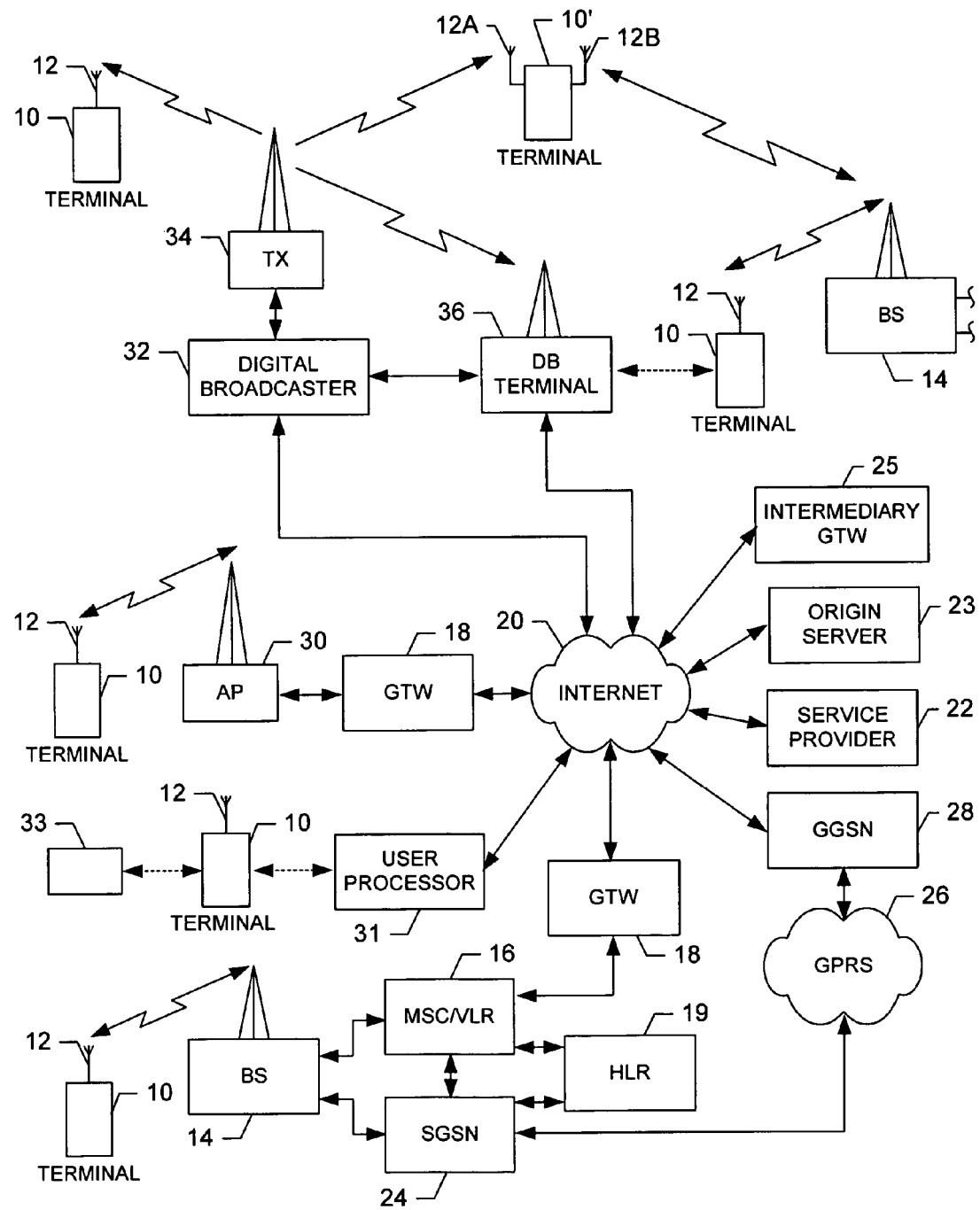
Figure 2:
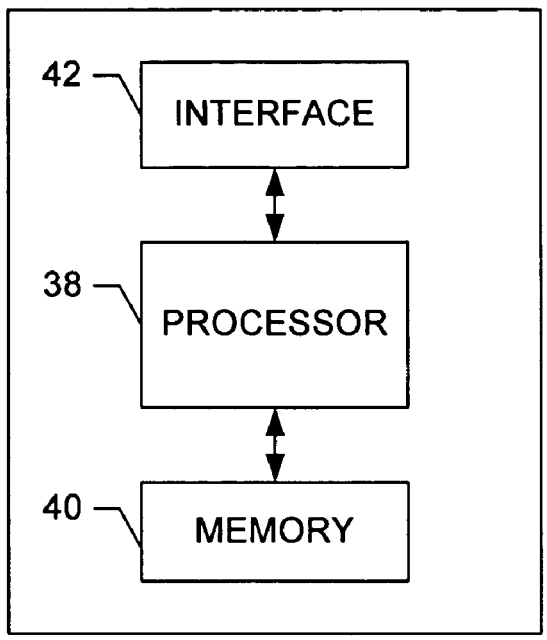
Figure 4:
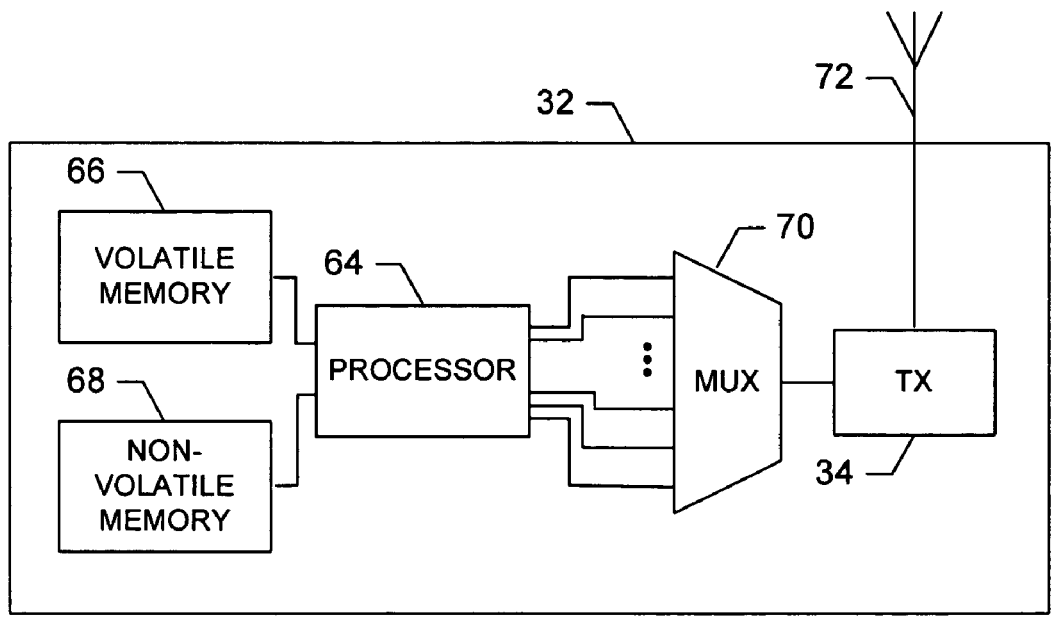
Figure 5:
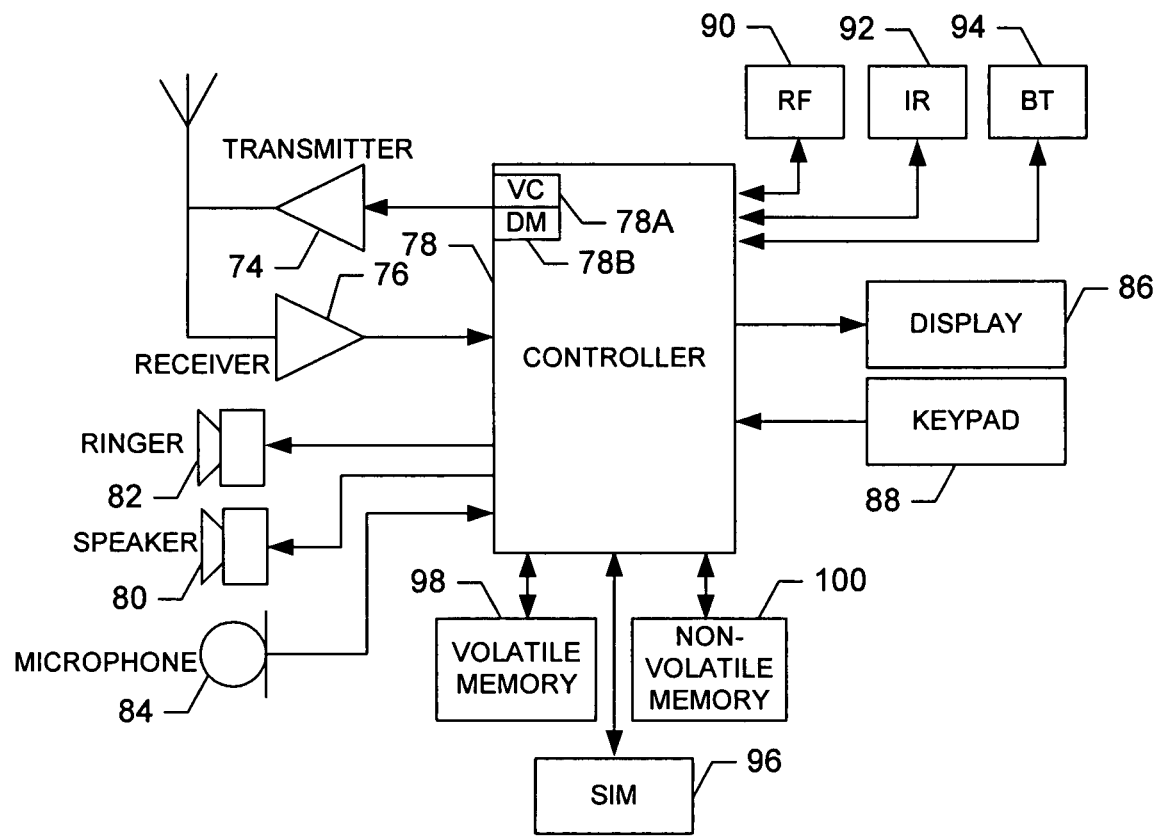
Figure 6:
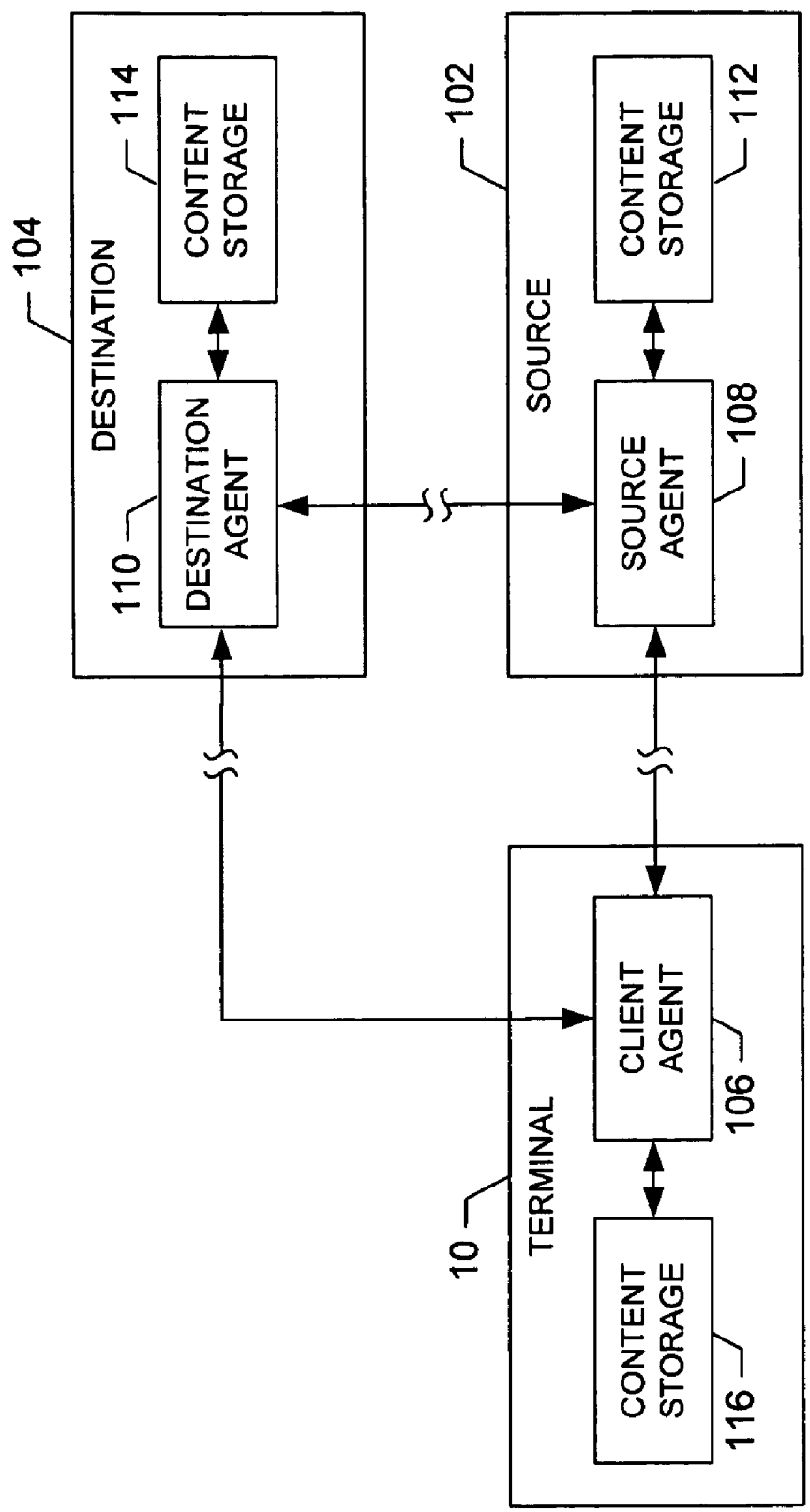
Figure 7:
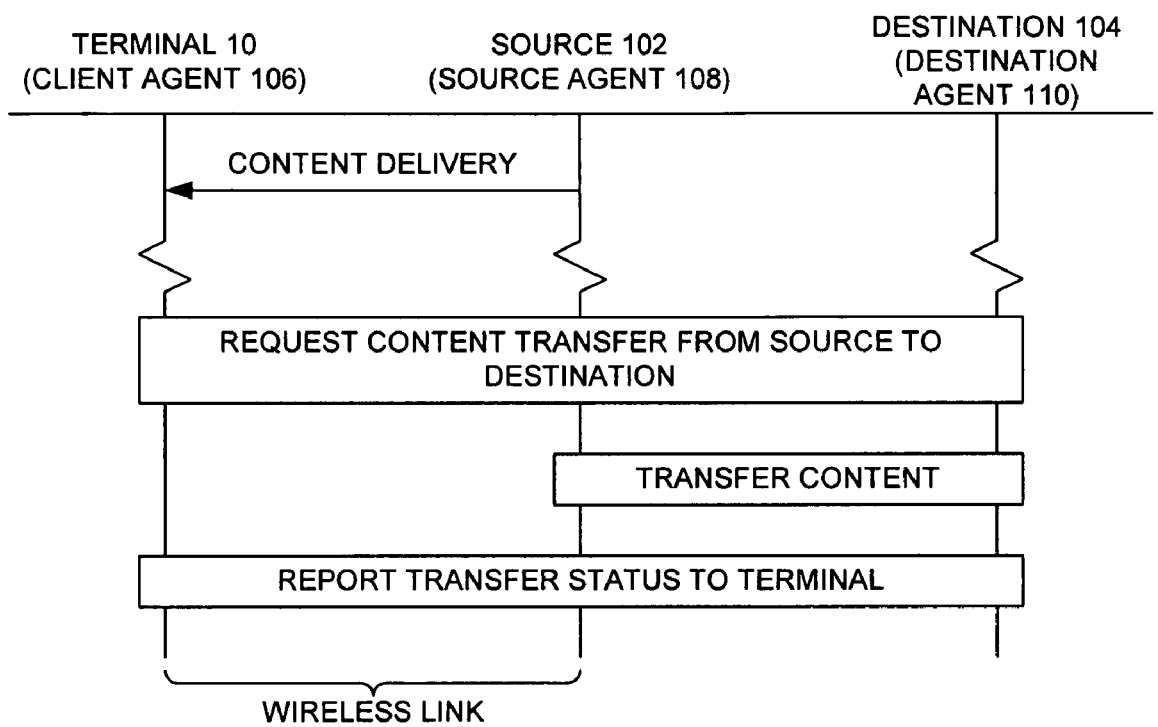
Figure 8A:
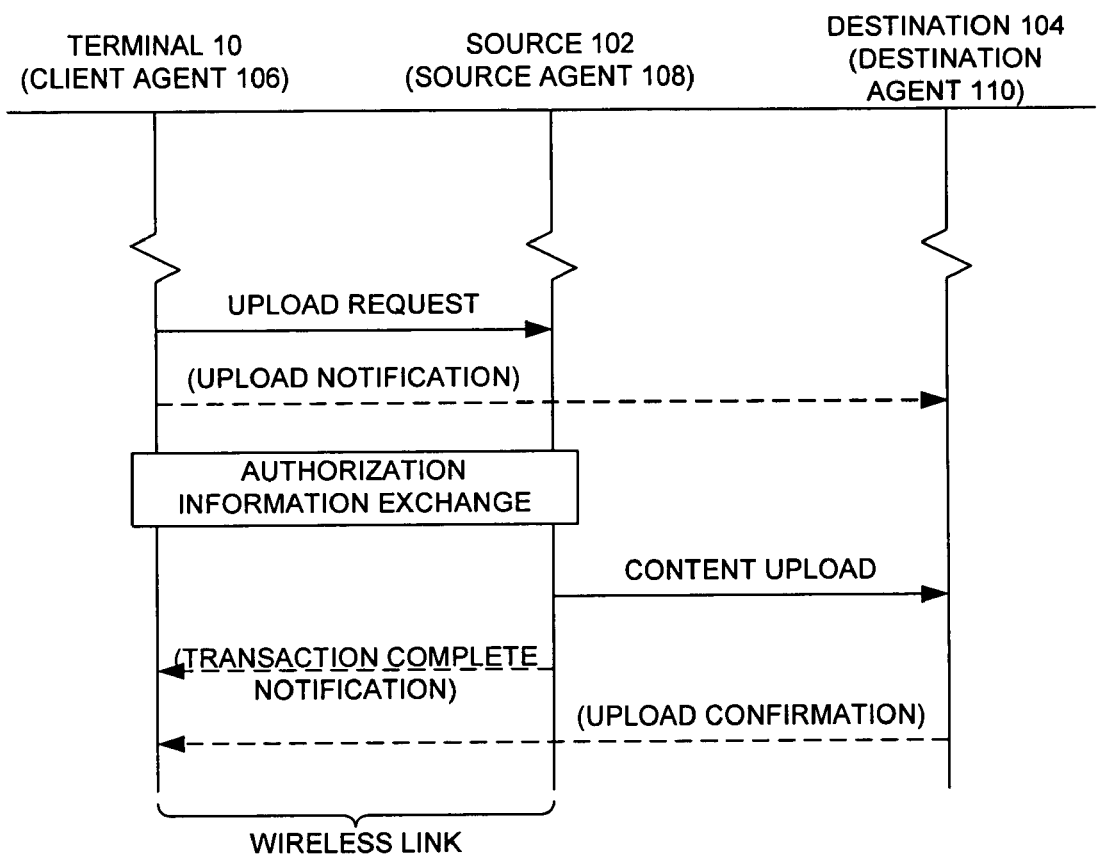
Figure 8B:
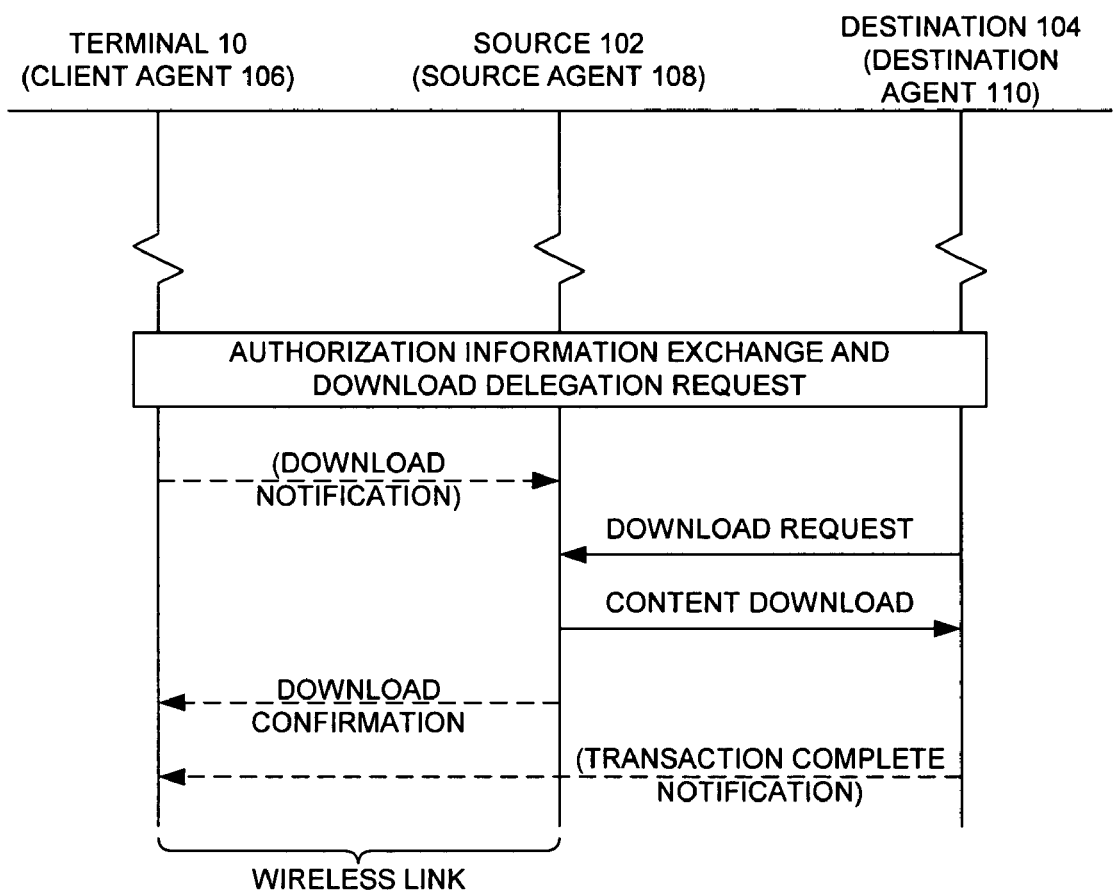
Figure 9A:
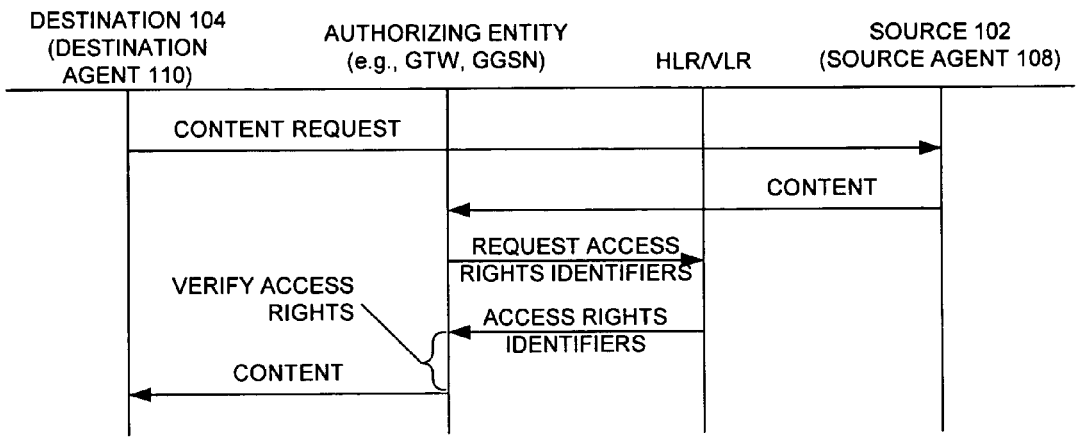
Figure 9B:
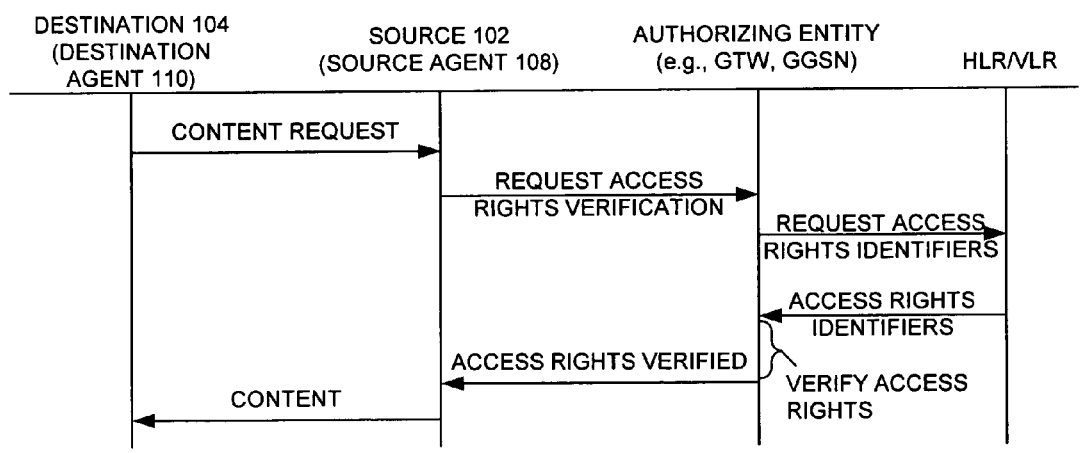

Having thus described the invention in general terms, reference will now be made to the accompanying drawings, which are not necessarily drawn to scale, and wherein:

FIG. 1 is a schematic block diagram of a wireless communications system according to one embodiment of the present invention including a cellular network and a data network to which a terminal is bi-directionally coupled through wireless RF links;

FIG. 2 is a schematic block diagram of an entity capable of operating as a terminal, service provider, origin server, digital broadcast receiver and/or a digital broadcaster, in accordance with embodiments of the present invention;

FIG. 3 is a functional block diagram of a digital broadcast receiver, in accordance with one embodiment of the present invention;

FIG. 4 is a functional block diagram of the digital broadcaster, in accordance with one embodiment of the present invention;

FIG. 5 is a schematic block diagram of a mobile station that may operate as a terminal, according to embodiments of the present invention;

FIG. 6 is a functional block diagram of a terminal directing a source of content to upload one or more pieces of content to a destination, or directing the destination to download piece(s) of content from the source, in accordance with one embodiment of the present invention;

FIG. 7 is a control flow diagram of various steps in a method of forwarding content in accordance with embodiments of the present invention;

FIGS. 8A and 8B are control flow diagrams of various steps in a method of forwarding content in line with a push technique and a pull technique, respectively, in accordance with embodiments of the present invention; and FIGS. 9A and 9B are control flow diagrams of various steps in methods of forwarding or transferring content in accordance with a DRM (digital rights management) technique of another aspect of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method, computer program product and integrated circuit assembly of embodiments of the present invention will be primarily described in conjunction with mobile communications applications. It should be understood, however, that the system, method, computer program product and integrated circuit assembly of embodiments of the present invention can be utilized in conjunction with a variety of other applications, both in the mobile communications industries and outside of the mobile communications industries. For example, the system, method, computer program product and integrated circuit assembly of embodiments of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of a cellular network that includes elements required to operate the network, such as a mobile switching center (MSC) 16. As well known to those skilled in the art, the cellular network may also be referred to as a Base Station/MSC/Interworking function (BMI). In operation, the MSC is capable of routing calls and messages to and from the terminal when the terminal is making and receiving calls. The MSC also provides a connection to landline trunks when the terminal is involved in a call. Further, the MSC can be coupled to a server gateway (GTW) 18.

Subscriber data of a terminal 10 is stored permanently in a Home Location Register (HLR) 19 of the system and temporarily in the Visitor Location Register (VLR) in the area of which the terminal is located at a given moment. In this regard, the VLR contains selected administrative information necessary for call control and provision of the subscribed services for each terminal currently located in the geographical area controlled by the VLR. Although each functional entity can be implemented as an independent unit, manufacturers of switching equipment generally implement the VLR together with the MSC 16 so that the geographical area controlled by the MSC corresponds to that controlled by the VLR, thus simplifying the signaling required. As such, the MSC and VLR will collectively be referred to herein as the MSC/VLR, as shown in FIG. 1.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 18, and the GTW is coupled to a WAN, such as the Internet 20. In turn, devices such as processing elements (e.g., personal computers, server computers or the like) can be coupled to the terminal 10 via the Internet. For example, as explained below, the processing elements can include one or more processing elements associated with a service provider 22 and an origin server 23, one of each being illustrated in FIG. 1.

In addition to the MSC 16, the BS 14 can be coupled to a signaling GPRS (General Packet Radio Service) support node (SGSN) 24. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 26. The packet-switched core network is then coupled to another GTW, such as a GTW GPRS support node (GGSN) 28, and the GGSN is coupled to the Internet.

By coupling the SGSN 24 to the GPRS core network 26 and the GGSN 28, devices such as service providers 22 and origin servers 23 can be coupled to the terminal 10 via the Internet 20, SGSN and GGSN. In this regard, devices such as service providers can communicate with the terminal across the SGSN, GPRS and GGSN. For example, service providers can provide content to the terminal, such as in accordance with the Multimedia Broadcast Multicast Service (MBMS). For more information on the MBMS, see Third Generation Partnership Project (3GPP) technical specification 3GPP TS 22.146, entitled: *Multimedia Broadcast Multicast Service (MBMS)*, the contents of which are hereby incorporated by reference in its entirety.

In addition to being coupled to the BS 14, the terminal 10 can be wirelessly coupled to one or more wireless access points (APs) 30. The APs can comprise access points configured to communicate in accordance techniques such as, for example, radio frequency (RF), Bluetooth (BT), infrared (IrDA) or any of a number of different wireless networking techniques, including WLAN techniques. Additionally, or alternatively, the terminal can be coupled to one or more user processors 31. Each user processor can comprise a computing system such as personal computers, laptop computers or the like. In this regard, the user processors can be configured to communicate with the terminal in accordance with techniques such as, for example, RF, BT, IrDA or any of a number of different wireline or wireless communication techniques, including Universal Serial Bus (USB), LAN and/or WLAN techniques. One or more of the user processors can additionally, or alternatively, include a removable memory capable of storing content, which can thereafter be transferred to the terminal.

The terminal 10 can further be coupled to one or more portable electronic devices 33, such multimedia capturing, producing and/or storing devices including, for example, other terminals. Like with the user processors 31, the terminal can be configured to communicate with the portable electronic devices in accordance with techniques such as, for example, RF, BT, IrDA or any of a number of different wireline or wireless communication techniques, including USB, LAN and/or WLAN techniques.

The APs 30 and user processors 31 may be coupled to the Internet 20. Like with the MSC 16, the APs and user processors can be directly coupled to the Internet. In one embodiment, however, the APs are indirectly coupled to the Internet via a GTW 18. As will be appreciated, by directly or indirectly connecting the terminals, the service provider 22 and the origin server 23, as well as any of a number of other devices, to the Internet, the terminals, as well as portable electronic devices coupled to such terminals, can communicate with one another, the service provider, etc., to thereby carry out various functions of the terminal (and portable electronic devices 33), such as to transmit data, content or the like to, and/or receive content, data or the like from, the service provider. As used herein, the terms "data," "content," "information" and similar terms may be used to interchangeably to refer to data capable of being transmitted, received and/or stored in accordance with embodiments of the present invention. Thus, use of any such terms should not be taken to limit the spirit and scope of the present invention.

Further, the terminal 10 can additionally, or alternatively, be coupled to a digital broadcaster 32 via a digital broadcast network, such as a terrestrial digital video broadcasting (e.g., DVB-T, DVB-H, ISDB-T, ATSC, etc.) network. As will be appreciated, by directly or indirectly connecting the terminals and the digital broadcaster, the terminals can receive content, such as content for one or more television, radio and/or data channels, from the digital broadcaster. In this regard, the digital broadcaster can include, or be coupled to, a transmitter (TX) 34, such as a DVB-T TX. Similarly, the terminal can include a receiver, such as a DVB-T receiver (not shown). The terminal can be capable of receiving content from any of a number of different entities in any one or more of a different number of manners. In one embodiment, for example, the terminal can comprise a terminal 10' capable of transmitting and/or receiving data, content or the like in accordance with a DVB (e.g., DVB-T, DVB-H, etc.) technique as well as a cellular (e.g., 1G, 2G, 2.5G, 3G, etc.) communication technique. In such an embodiment, the terminal 10' may include an antenna 12A for receiving content from the DVB-T TX, and another antenna 12B for transmitting signals to and for receiving signals from a BS 14. For more information on such a terminal, see U.S. patent application Ser. No. 09/894,532, entitled: Receiver, filed Jun. 29, 2001, the contents of which is incorporated herein by reference in its entirety.

In addition to, or in lieu of, directly coupling the terminal 10 to the digital broadcaster 32 via the TX 34, the terminal can be coupled to a digital broadcast (DB) receiver 36 which, in turn, can be coupled to the digital broadcaster 32, such as directly and/or via the TX. In such instances, the digital broadcast receiver can comprise a DVB-T receiver, such as a DVB-T receiver in the form of a set top box. The terminal can be locally coupled to the digital broadcast receiver, such as via a personal area network. In one embodiment, however, the terminal can additionally or alternatively be indirectly coupled to the digital broadcast receiver via the Internet 20.

Referring now to FIG. 2, a block diagram of an entity capable of operating as a terminal 10, service provider 22, origin server 23, user processor 31, portable electronic device 33, digital broadcast receiver 36, and/or a digital broadcaster 32 is shown in accordance with one embodiment of the present invention. Although shown as separate entities, in some embodiments, one or more entities may support one or more of a terminal, service provider, origin server, user processor, portable electronic device, digital broadcast receiver, and/or a digital broadcaster, logically separated but co-located within the entit(ies). For example, a single entity may support a logically separate, but co-located, terminal and digital broadcast receiver. Also, for example, a single entity may support a logically separate, but co-located digital broadcast receiver and digital broadcaster.

As shown, the entity capable of operating as a terminal 10, service provider 22, origin server 23, user processor 31, portable electronic device 33, digital broadcast receiver 36, and/or a digital broadcaster 32 can generally include a processor 38 connected to a memory 40. The processor can also be connected to at least one interface 42 or other means for transmitting and/or receiving data, content or the like. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention.

As explained below, when the entity comprises a terminal 10, the memory 40 can store a client agent capable of requesting that content residing in memory of a source be forwarded to a destination, as explained below. Irrespective of whether the entity comprises a terminal, however, the memory can store a source agent capable of forwarding or otherwise transferring content to a destination, such as in response to a request from a terminal. Further, the memory can additionally or alternatively store a destination agent capable of communicating with a source to receive content forwarded or otherwise transferred by the source.

Reference is now made to FIG. 3, which illustrates a functional block diagram of a digital broadcast receiver 36, in accordance with one embodiment of the present invention. As shown, the digital broadcast receiver includes an antenna 44 for receiving signals from a digital broadcaster 32 and feeding the signals into a receiver (RX) 46. In turn, the receiver is capable of decrypting, demodulating and/or demultiplexing the signals, such as to extract content data. The receiver can feed the content data to a processor 48, which can thereafter decode the content data. The processor can then feed the decoded signal into an audio/video (A/V) interface 50, which can convert signals to a form suitable for display by a monitor, such as a television set 52.

The digital broadcast receiver 36 can include volatile memory 54, such as volatile Random Access Memory (RAM) including a cache area for the temporary storage of data. The digital broadcast receiver can also include non-volatile memory 56, which can be embedded and/or may be removable. The non-volatile memory can additionally or alternatively comprise an EEPROM, flash memory, hard disk or the like. The memories can store any of a number of pieces of information, content and data, used by the digital broadcast receiver to implement the functions of the digital broadcast receiver. For example, as indicated above, the memories can store content, such as that received from a digital broadcaster 32. Also, for example, the memories can store a source agent and/or destination agent capable of communicating to forward content from a source to a destination, such as in response to request from a terminal.

The digital broadcast receiver 36 can also include one or more interface means for sharing and/or obtaining data from electronic devices, such as terminals 10 and/or digital broadcasters 32. More particularly, the digital broadcast receiver can include a network interface means 60, for sharing and/or obtaining data from a network, such as the Internet 20. For example, the digital broadcast receiver can include an Ethernet Personal Computer Memory Card International Association (PCMCIA) card configured to transmit and/or receive data to and from a network, such as the Internet.

The digital broadcast receiver 36 can also include one or more local interface means 62 for locally sharing and/or obtaining data from electronic devices, such as a terminal. For example, the digital broadcast receiver can include a radio frequency transceiver and/or an infrared (IR) transceiver so that data can be shared with and/or obtained in accordance with radio frequency and/or infrared transfer techniques. Additionally, or alternatively, for example, the digital broadcast receiver can include a Bluetooth (BT) transceiver operating using Bluetooth brand wireless technology developed by the Bluetooth Special Interest Group such that the digital broadcast receiver can share and/or obtain data in accordance with Bluetooth transfer techniques. Further, the digital broadcast receiver can additionally or alternatively be capable of sharing and/or obtaining data in accordance with any of a number of different wireline and/or wireless networking techniques, including LAN and/or WLAN techniques.

Reference is now made to FIG. 4, which illustrates a functional block diagram of the digital broadcaster 32 of one embodiment of the present invention. Like the digital broadcast receiver 36, the digital broadcaster can include a processor 64 capable of carrying out the functions of the digital broadcaster. The digital broadcaster can also include volatile memory 66, such as volatile Random Access Memory (RAM) including a cache area for the temporary storage of data. The digital broadcaster can also include non-volatile memory 68, which can be embedded and/or may be removable. The non-volatile memory can additionally or alternatively comprise an EEPROM, flash memory, hard disk or the like. The memories can store any of a number of pieces of information, content and data, used by the digital broadcaster to implement the functions of the digital broadcaster. For example, as indicated above, the memories can store content, such as content for a television channel and other content for a number of other television, radio and/or data channels. Also, for example, the memories can store a source agent and/or destination agent, as explained below.

The digital broadcaster 32 can also include a multiplexer 70, which can be capable of multiplexing content for a number of television, radio and/or data channels. The multiplexer can then feed the resulting signal into a TX 34, which can be separate from the digital broadcaster, as shown in FIG. 1, or incorporated within the digital broadcaster, as shown in FIG. 4. Irrespective of where the TX is located relative to the digital broadcaster, the TX can receive the signal from the multiplexer for encryption, modulation, amplification and/or transmission, such as via an antenna 72. In this regard, for example, the digital broadcaster can be capable of directly or indirectly transmitting content to a digital broadcast receiver 36 and/or a terminal 10, such as in accordance with a digital broadcasting technique, such as DVB-T. For information on DVB-T, see European Telecommunications Standards Institute (ETSI) Standard EN 300 744, entitled: *Digital Video Broadcasting (DVB): Framing structure, channel coding and modulation for digital terrestrial television*, v.1.1.2 (1997) and related specifications, the contents of which are hereby incorporated by reference in their entirety.

In accordance with a number of digital broadcasting techniques, such as DVB-T, Internet Protocol (IP) Datacast (IPDC) can be utilized to provide audio, video and/or other content to terminals 10. In this regard, the digital broadcaster 32 can be capable of providing IP datacasting content to the terminal utilizing a digital broadcasting technique. As will be appreciated by those skilled in the art, digital broadcasting techniques such as DVB-T are essentially cellular in nature with a transmission site associated with each of a number of different cells. DVB-T, for example, uses MPEG-2 transport streams, and as such, IP data can be encapsulated into DVB transmission signals sent from the digital broadcaster, or more particularly the TX 34. Data streams including IP datagrams can be supplied from several sources, and can be encapsulated by an IP encapsulator (not shown). The IP encapsulator, in turn, can feed the encapsulated IP data streams into the data broadcasting (e.g., DVB-T) network.

The encapsulated IP data streams can then be transported to one or more transmission sites, where the transmission sites form cells of the data broadcasting network. For example, the encapsulated IP data streams can be transported to one or more transmission sites on an MPEG-2 transport stream for subsequent transmission over the air directly to the terminals, or to a receiver station serving one or more terminals. As will be appreciated, the MPEG-2 transport stream, from production by the IP encapsulator, to reception by the terminals or the receiver station, is typically uni-directional in nature. In this regard, IP packets containing the data can be embedded in multi-protocol encapsulation (MPE) sections that are transported within transport stream packets.

In addition to the IP packets, the MPE sections can also include forward error correction (FEC) information and time slicing information. By including information such as time slicing information, data can be conveyed discontinuously with the receiver (e.g., terminal 10), being capable of saving battery power by switching off when no data is being transmitted to the receiver. In other terms, in accordance with one time slicing technique, instead of using the current default method of continuous digital broadcasting (e.g., DVB-T) transmission, a time division multiplex-type of allocation technique can be employed (see, e.g., DVB-H standard). With such an approach, then, services can be provided in bursts, allowing a receiver to power down when the receiver is not receiving data, and allowing the receiver to power up to receive data packets, as necessary.

FIG. 5 illustrates a functional diagram of a mobile station that may operate as a terminal 10, according to embodiments of the invention. It should be understood, that the mobile station illustrated and hereinafter described is merely illustrative of one type of terminal that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers, digital cameras and other types of voice, text and multimedia communications systems, can readily employ the present invention.

The mobile station includes a transmitter 74, a receiver 76, and a processor such as a controller 78 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first-generation (1G), second-generation (2G), 2.5G and/or third-generation (3G) communication protocols or the like. For example, the mobile station may be capable of operating in accordance with 2G wireless communication protocols IS-136 (TDMA), GSM, and IS-95 (CDMA). The mobile station can additionally or alternatively be capable of operating in accordance with any of a number of different digital broadcasting techniques, such as the DVB technique (e.g., DVB-T, ETSI Standard EN 300 744). The mobile station can also be capable of operating in accordance with any of a number of different broadcast and/or multicast techniques, such as the MBMS technique (e.g., 3GPP TS 22.146). Further, the mobile station can be capable of operating in accordance with ISDB-T, DAB, ATSC techniques or the like. Some narrow-band AMPS (NAMPS), as well as TACS, mobile stations may also benefit from embodiments of the present invention, as should dual or higher mode mobile stations (e.g., digital/analog or TDMA/CDMA/analog phones).

It is understood that the controller 78 includes the circuitry required for implementing the audio and logic functions of the mobile station. For example, the controller may be comprised of a digital signal processor device, a microprocessor device, and various analog to digital converters, digital to analog converters, and/or other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 78A, and may include an internal data modem (DM) 78B. Further, the controller may include the functionally to operate one or more software applications, which may be stored in memory.

The mobile station also comprises a user interface including a conventional earphone or speaker 80, a ringer 82, a microphone 84, a display 86, and a user input interface, all of which are coupled to the controller 78. The user input interface, which allows the mobile station to receive data, can comprise any of a number of devices allowing the mobile station to receive data, such as a keypad 88, a touch display (not shown) or other input device. In embodiments including a keypad, the keypad includes the conventional numeric (0-9) and related keys (#, *), and other keys used for operating the mobile station.

The mobile station can also include one or more means for sharing and/or obtaining data from electronic devices, such as another terminal 10, a service provider 22, an AP 30, a portable electronic device 33, a digital broadcast receiver 36, a digital broadcaster 32 or the like, in accordance with any of a number of different wireline and/or wireless techniques. For example, the mobile station can include a radio frequency (RF) transceiver 90 and/or an infrared (IR) transceiver 92 such that the mobile station can share and/or obtain data in accordance with radio frequency and/or infrared techniques. Also, for example, the mobile station can include a Bluetooth (BT) transceiver 94 such that the mobile station can share and/or obtain data in accordance with Bluetooth transfer techniques. Although not shown, the mobile station can include one or more ports, such as a USB port, such that the mobile station can share and/or obtain data in accordance with a number of wireline techniques, such as in accordance with a USB technique. Also not shown, the mobile station may additionally or alternatively be capable of transmitting and/or receiving data from electronic devices according to a number of different wireline and/or wireless networking techniques, including LAN and/or WLAN techniques. In this regard, as shown in FIG. 1 with respect to terminal 10', the mobile station may include an additional antenna or the like to transmit and/or receive data from such electronic devices (e.g., digital broadcaster).

The mobile station can further include memory, such as a subscriber identity module (SIM) 96, a removable user identity module (R-UIM) or the like, which typically stores information elements related to a mobile subscriber. In addition to the SIM, the mobile station can include other memory. In this regard, like the digital broadcast receiver 36 and the digital broadcaster 32, the mobile station can include volatile memory 98. Also, again like the digital broadcast receiver and the digital broadcaster, the mobile station can include other non-volatile memory 100, which can be embedded and/or may be removable. The memories can store any of a number of pieces of information, and data, used by the mobile station to implement the functions of the mobile station. For example, the memories can store content, such as that received from a service provider 22 and/or a digital broadcast receiver. Also, for example, the memories can also store client applications such as a conventional Web browser for communicating in accordance with the hypertext transfer protocol (HTTP), a file transfer (e.g., FTP) application, a Telnet application, a peer-to-peer access application, or the like. Further for example, as explained further below, the memories can store applications such as a client agent, source agent, and/or destination agent.

As explained in the background section, to relieve at least a portion of the storage capacity burden on mobile terminals, techniques have been developed whereby mobile terminals are capable of transferring, or uploading, content from mobile terminals to servers or the like with increased storage capacity. However, because conventional uploading techniques typically include uploading content at least partially over a wireless link, such techniques typically suffer from increased latency due to a narrow radio bandwidth, and due to a layer of the radio link that accounts for high bit error rates. Thus, in accordance with embodiments of the present invention, a terminal 10 is capable of directing a source of content to upload one or more pieces of content from the source to a destination, which can thereafter store the piece(s) of content. Alternatively, the terminal can be capable of directing the destination to download, and thereafter store, the piece(s) of content from the source.

Typically, the source and destination are capable of transferring the content in a manner such that the transfer can occur without the latency that follows transferring content over a wireless link. Also, in one typical scenario, the terminal 10 directs the source to upload, or the destination to download, piece(s) of content previously received by the terminal from the source. In such instances, after the destination stores the piece(s) of content, the terminal can delete or otherwise remove the respective piece(s) of content from memory of the terminal. Thereafter, if so desired, the terminal can be capable of downloading the respective piece(s) of content from the destination. The terminal can therefore be capable of effectively offloading piece(s) of content stored by the terminal to memory of the destination to relieve at least a portion of the storage capacity burden on the terminal, without requiring the terminal to transfer the respective piece(s) of content from the terminal to the destination over a wireless link.

Reference is now drawn to FIG. 6, which illustrates a functional block diagram of a terminal 10 directing a source 102 of content to upload one or more pieces of content to a destination 104, or directing the destination to download piece(s) of content from the source. As shown, the terminal is capable of operating an application, such as a client agent 106, which is capable of communicating with the source and/or destination to effectuate the transfer of content from the source to the destination. More particularly, the client agent is capable of communicating with a source agent 108 and/or a destination agent 110 capable of being operated by the source and/or a destination, respectively, such that the source and destination agents can thereafter communicate to transfer content in content storage 112 of the source, to the destination, which can thereafter store the content in content storage 114 of the destination. And in one typical embodiment, the client agent is also capable of managing content storage 116 such that the client agent can effectuate the transfer of content stored by the source, where the same content is also stored by the terminal. As such, in such instances, after the content is transferred from the source to the destination, the client agent can delete or otherwise remove the same content from the terminal. Thereafter, the client agent or another application operating on the terminal can download the transferred content from the destination.

As shown and described herein, the client agent 106, source agent 108 and destination agent 110 each comprise software operated by the terminal 10, source 102 and destination 104, respectively. It should be understood, however, that the client agent, source agent and/or destination agent can alternatively comprise firmware or hardware, without departing from the spirit and scope of the present invention. Generally, then, the terminal, source and destination can include one or more logic elements for performing various functions of the client agent, source agent and destination agent, respectively. As will be appreciated, the logic elements can be embodied in any of a number of different manners. In this regard, the logic elements performing the functions of an agent can be embodied in an integrated circuit assembly including one or more integrated circuits integral or otherwise in communication with a respective network entity (i.e., terminal, source, destination, etc.) or more particularly, for example, a processor 38 of the respective network entity.

Also, although the client agent, source agent and destination agent are shown and described as being local to the terminal, source and destination, respectively, any one or more of the client agent, source agent and destination agent can alternatively be distributed from, and in communication with, the terminal, source and destination, respectively, such as across the Internet 20. Further, as shown and described herein, content is forwarded or transferred from a source to a destination. It should be understood, however, that the terms "transferring" and "forwarding" can be used herein interchangeably, and that transferring or forwarding content can include, for example, moving or copying content from the source to the destination, without departing from the spirit and scope of the present invention.

The system, method, computer program product and integrated circuit assembly of embodiments of the present invention will now be described in more detail with respect to a terminal 10 directing a source 102 to upload content to a destination 104, or directing the destination to download content from the source. As also described, the content comprises content for one or more television, radio and/or data channels previously received, and stored by the terminal such as in content storage 116. The source of the content comprises a digital broadcaster 32, and the destination of the content comprises a service provider 22 capable of providing storage capacity to the terminal. It should be understood, however, that the content can comprise any of a number of different types of pieces of content stored in content storage 112 of the source, whether previously received by the terminal or otherwise.

In addition, a source 104 can comprise any entity (e.g., terminal 10, service provider 22, origin server 23, user processor 31, portable electronic device 33, digital broadcast receiver 36, digital broadcaster 32, etc.) functioning in accordance with embodiments of the present invention to store content and transfer one or more pieces of such content to a destination 104. The destination 104, on the other hand, can comprise any entity (e.g., terminal, service provider, origin server, user processor, portable electronic device, digital broadcast receiver, digital broadcaster, etc.) functioning in accordance with embodiments of the present invention to receive content from the source and thereafter store the content, and/or transfer the stored content to the terminal, if so desired. As will be further appreciated, although functionally operating in different manners, the same entity can, at different times, function as a source, destination or both a source and a destination. Similarly, a terminal, at different times, can function as a source, destination, or both a source and a destination.

Reference is now made to FIG. 7, which illustrates a control flow diagram of various steps in a method of forwarding content in accordance with embodiments of the present invention. In one typical embodiment, as shown, the method can include the terminal 10 downloading or otherwise receiving one or more pieces of content from a source 102, where the terminal can thereafter store the piece(s) of content in content storage 116. The terminal can download the piece(s) of content from the source in any of a number of different manners, but in one typical embodiment, the terminal downloads the piece(s) of content from the source at least partially over a wireless link, such as within a cellular network, digital broadcast network or the like (see FIG. 1).

As will be appreciated, at some point subsequent to storing the piece(s) of content, it may be desirable to remove the piece(s) of content from content storage 116 of the terminal to thereby relieve at least a portion of the storage capacity burden on the terminal. And as will also be appreciated, while it may be desirable to remove the piece(s) of content from the terminal, it may also be desirable to store the content remote from the terminal, such as at a destination 104 providing storage capacity (within content storage 114) to the terminal, such that the terminal can, at some subsequent time, retrieve the content from the destination.

To effectively transfer the piece(s) of content to the destination 104 without transferring the piece(s) of content from the terminal 10 over a wireless link, the terminal can request that the same piece(s) of content, which are stored in content storage 112 of the source 102, be transferred from the source to the destination and stored by the destination. Generally, the request can be formatted in accordance with any of a number of different protocols, such as the Hypertext Transfer Protocol (HTTP), and can include any of a number of different pieces of information. For example, the request can identify the piece(s) of content and the location of the piece(s) of content within content storage 112 of the source, as well as the location within content storage 114 of the destination where the terminal prefers that the destination store the piece(s) of content. In such instances, the piece(s) of content and the location within content storage of the source and destination can be identified in any of a number of different manners, such as by a uniform resource identifier (URI).

As will be appreciated, in various instances it may be desirable to verify the identity of the terminal 10 or the terminal user. In such instances, when the terminal requests that the content be transferred from the source to the destination, the terminal can provide authorization information, parameters or the like such that the identity of the terminal or terminal user can be verified before the content is transferred. For example, the terminal can provide authorization information including a username/password combination to one or more authorizing entities (e.g., GTW 18, GGSN 28, source 102, destination 104, etc.) capable of verifying the identity of the terminal or terminal user based upon the username/password combination.

Before providing the authorization information to the authorization entit(ies), the terminal 10 can, if so desired, encrypt the authorization information in accordance with a PKI (public key infrastructure) technique, for example. In such instances, the terminal can encrypt the authorization information for each authorizing entity using a public key of the respective authorizing entity. Also in such instances, the encrypted authorization information can include a time stamp defining an absolute or relative period of time that the authorization information can be decrypted or is otherwise valid. For example, the time stamp can define a period of time only including the first instance of decrypting the authorization information such that the encrypted authorization information can only be decrypted and thereafter utilized to verify the identity of the terminal or terminal user relative to the respective request to transfer the identified content from the source 102 to the destination 104.

Irrespective of how the identity of the terminal 10 or terminal user is verified, thereafter the source 102 and destination 104, or more particularly the source agent 108 and destination agent 110, can communicate to transfer the content from content storage 112 of the source to content storage 114 of the destination. The content can be transferred in any of a number of different manners. In one typical embodiment, for example, the content is transferred in a manner that does not suffer from the latency that would otherwise be experienced by transferring the same content at least partially over a wireless link, such as by transferring the content substantially over a wireline link, such as across the Internet 20. During or following the content transfer from the source to the destination, the source and/or destination can report the status of the transfer to the terminal, such as to inform the terminal that the content transfer is complete. Thereafter, the client agent 106 can, if so desired, remove the same content from content storage 116 of the terminal (provided the same content is stored in content storage 116).

As indicated above, the terminal 10 can be capable of directing the source 102 to upload one or more pieces of content from the source to the destination 104, or alternatively, can be capable of directing the destination to download the piece(s) of content from the source. In this regard, reference is now made to the control flow diagrams of FIGS. 8A and 8B, which more particularly illustrate various steps in alternative embodiments of a method of forwarding content. As shown in FIG. 8A, a push technique for forwarding content can include the terminal, or more particularly the client agent 106, sending an upload request to the source 102, or more particularly the source agent 108. As indicated above, for example, the request can be formatted in accordance with HTTP, and identify the piece(s) of content and the location of the piece(s) of content within content storage 112 of the source, and/or the location within content storage 114 of the destination where the terminal prefers that the destination store the piece(s) of content. In addition, the upload request can include source authorization information, parameters or the like such that the identity of the terminal or terminal user can be verified by the source agent before the source agent uploads the content. For example, the source authorization information can include a username/password combination known only to the terminal 10 (or terminal user) and the source agent.

In addition to sending the upload request to the source agent 108, the client agent 106 can, if so desired, send an upload notification to the destination 104, or more particularly the destination agent 110, to thereby notify the destination agent of the forthcoming content from the source. Similar to the upload request, the upload notification can be formatted in accordance with HTTP, for example, and identify the piece(s) of content and the location of the piece(s) of content within content storage 112 of the source, and/or the location within content storage 114 of the destination where the terminal prefers that the destination store the piece(s) of content.

Within the upload request, or as or after sending the upload request, the client agent 106 can send the source agent 108 destination authorization information, parameters or the like such that the identity of the terminal or terminal user can be verified by the destination before the source agent uploads the content to the destination. For example, the destination authorization information can include a username/password combination known only to the terminal 10 (or terminal user) and the destination agent 110. As explained above, however, before sending the authorization information, the client agent can encrypt the destination authorization information and include a timestamp defining a period of time the authorization information is valid.

Upon receipt of the upload request, or typically after receipt of the destination authorization information, the source agent 108 can communicate with the destination agent 110 to initiate uploading the content identified in the upload request. In this regard, the source agent can decrypt the destination authorization information, if necessary, and send the destination authorization information to the destination agent. Based upon the destination authorization information, then, the destination agent can verify the identity of the terminal or terminal user. Provided the identity of the terminal or terminal user is verified, the source agent can thereafter upload the content to the destination. As indicated above, the content can be uploaded from the source 102 to the destination in any of a number of different manners, such as in a manner that does not suffer from the latency that would otherwise be experienced by uploading the same content at least partially over a wireless link. For example, the content can be uploaded to the destination across the Internet 20 in accordance with HTTP.

During or following the content upload to the destination 104, the destination agent 110 can store the content at the location within content storage 114 of the destination where the terminal 10 prefers that the destination store the piece(s) of content, also identified in the upload request. Also during or following the content upload, the source agent 108 and/or destination agent can report the status of the transfer to the terminal. For example, the source agent can send a transaction complete notification to the terminal to thereby notify the terminal that the source agent has completed the content upload to the destination. Similarly, the destination agent can send an upload confirmation to the terminal to thereby confirm the content upload and storage by the destination.

As shown in FIG. 8B, a pull technique for forwarding content can include the terminal, or more particularly the client agent 106, sending a download delegation request to the destination 104, or more particularly the destination agent 110. Like the upload request, the download delegation request can be formatted in accordance with HTTP, and identify the piece(s) of content and the location of the piece(s) of content within content storage 112 of the source, and/or the location within content storage 114 of the destination where the terminal prefers that the destination store the piece(s) of content. In addition, the download delegation request can include destination authorization information, parameters or the like (e.g., username/password), such that the identity of the terminal or terminal user can be verified by the destination agent before the destination agent downloads the content.

In addition to sending the download delegation request to the destination agent 110, the client agent 106 can, if so desired, send a download notification to the source 102, or more particularly the source agent 108, to thereby notify the source agent of the forthcoming content download by the destination. Similar to the download request, the download notification can be formatted in accordance with HTTP, for example, and identify the piece(s) of content and the location of the piece(s) of content within content storage 112 of the source, and/or the location within content storage 114 of the destination where the terminal prefers that the destination store the piece(s) of content.

Within the download delegation request, or as or after sending the download delegation request, the client agent 106 can send the destination agent 110 source authorization information, parameters or the like (e.g., username/password) such that the identity of the terminal or terminal user can be verified by the source before the destination agent downloads the content from the source. Before sending the authorization information, the client agent can encrypt the source authorization information and include a timestamp defining a period of time the authorization information is valid.

Upon receipt of the download delegation request, or typically after receipt of the source authorization information, the destination agent 110 can communicate with the source agent 108 to initiate downloading the content identified in the download delegation request. In this regard, the destination agent can decrypt the source authorization information, if necessary, and send the source authorization information to the source agent, such as in a download request. Based upon the source authorization information, then, the source agent can verify the identity of the terminal or terminal user. Provided the identity of the terminal or terminal user is verified, the destination agent can thereafter download the content from the source such as, for example, across the Internet 20 in accordance with HTTP.

Similar to before, during or following the content download from the source 102, the destination agent 110 can store the content at the location within content storage 114 of the destination where the terminal 10 prefers that the destination store the piece(s) of content, also identified in the upload request. Also during or following the content download, the source agent 108 and/or destination agent can report the status of the transfer to the terminal. For example, the destination agent can send a transaction complete notification to the terminal to thereby notify the terminal that the destination agent has completed the content download, and stored the content. Similarly, the source agent can send a download confirmation to the terminal to thereby confirm the content download by the destination.

As will be appreciated, and as also explained in the background section, in various instances it may be desirable to protect content from being transferred from one device to another, such as the content forwarded from a source 102 to a destination 104. In this regard, it may be desirable to verify that the source and/or destination is authorized or otherwise has rights to the content. More particularly with respect to forwarding content at the direction of a terminal 10, it may be desirable to verify that the terminal and/or destination is authorized or otherwise has rights to content transferred from the source. Thus, in accordance with another aspect of the present invention, a digital rights management (DRM) technique is provided for content transferred from a source to a destination. Although the DRM technique of embodiments of the present invention can be adapted to the forwarding of content from the source to the destination at the direction of a terminal, it should be understood that the DRM technique can be utilized in any of a number of other instances of transferring content, without departing from the spirit and scope of the present invention.

In accordance with the DRM technique of embodiments of the present invention, an authorizing entity (e.g., GTW 18, GGSN 28, etc.) or another entity, such as a content origin (e.g., a source 102) or a cellular operator (not shown), is capable of providing at least one digital rights service group including at least one source and/or destination 104, where the digital rights service group defines a level of access of the source and/or destination to protected content. To facilitate granting the source and/or destination access to such protected content, the entity is also capable of associating the respective source(s) and/or destination(s) with a digital rights service group identifier that identifies the respective digital rights service group. For example, the source and/or destination can be included within a digital rights service group of a cellular operator providing one or more services from one or more content origins to the source and/or destination, where the operator has access rights to the protected content of the content origin(s).

A digital rights service group can include one or more sources 102 and/or destinations 104. Likewise, the digital rights service group can define a level of access to any one or more pieces of protected content. For example, the digital rights service group can define access to all of the content available from the origin of such content, or access to one or more specified pieces of content from a content origin (e.g., a source 102). Each source and destination can be included within one or more different digital rights service groups, and thus, can be associated with one or more digital rights service group identifiers. In one embodiment, for example, a source or destination can be associated with a digital rights service group identifier generally defining access to protected content available from a specified content origin. In addition, the source or destination can be associated with one or more other digital service group identifiers, referred to as supplemental group identifiers, defining access to one or more specified pieces of protected content available from a different content origin, or the same content origin as specified in the digital rights service group identifier generally defining access to protected content available from the respective content origin.

The digital rights service group identifiers and supplemental group identifiers can be stored in any of a number of different locations such that the respective identifiers can be recalled to verify that the respective source 102 and/or destination 104 is authorized or otherwise has rights to protected content. For example, for sources and/or destinations that comprise terminals 10, or for terminals directing the transfer of content, the identifiers can be permanently stored along with subscriber data for the terminals in a HLR 19 of the system, and can be temporarily stored in the VLR in the area of which the respective terminals are located at a given moment, as shown in FIG. 1. Thus, before content is transferred or otherwise forwarded from a source to a destination, an authorizing entity, such as a GTW 18 or GGSN 28, can communicate with the HLR/VLR to verify if the source, destination, and/or terminal directing the transfer (if a terminal other than the source and destination is directing the transfer), has access rights to the respective content.

If the source 102, destination 104 or terminal 10 directing the transfer (if a terminal other than the source and destination is directing the transfer) has access rights to the respective content, the authorizing entity (e.g., GTW 18, GGSN 28, etc.) can permit the transfer. Otherwise, the authorizing entity can prevent the transfer. It should be noted that in various instances the source is also the origin of the content. In such instances, the authorizing entity may require the destination or terminal directing the transfer to have access rights, irrespective of any access rights of the source.

In addition to controlling the transfer of content based upon access rights to protected content, the authorizing entity, or another entity (e.g., origin server 23) in communication with the authorizing entity, can be capable of monitoring the transfer of each piece of protected content. The authorizing entity or other entity can then determine a frequency of transferring the respective piece of content from sources 102 to destinations 104. By monitoring the transfer and determining the transfer frequency, the creators of the transferred content can be compensated based upon the transfer and/or the transfer frequency.

Reference is now made to FIGS. 9A and 9B, which illustrate control flow diagrams of various steps in methods of forwarding or transferring content in accordance with a DRM technique of another aspect of the present invention. As will be appreciated, the content can be transferred from a source 102 to a destination 104 in accordance with any of a number of different communication or transfer techniques, including any of a number of different cellular (e.g., 1G, 2G, 2.5G, 3G, etc.) communication techniques such as GPRS, EDGE, MBMS, DVB (e.g., DVB-T, DVB-H, etc.), any of a number of different short range communication techniques such as RF, BT, IrDA, and/or any of a number of different wireline and/or wireless networking techniques such as LAN and/or WLAN techniques.

As shown in FIGS. 9A and 9B, a destination 104, or more particularly a destination agent 110 of the destination, can request one or more pieces of protected content from the source 102. As before, the request can be formatted in accordance with any of a number of different protocols, such as HTTP, and can include any of a number of different pieces of information. For example, the request can identify the destination, the piece(s) of content, and the location of the piece(s) of content within content storage 114 of the destination. As will be appreciated, however, instances in which the destination requests the protected content from the source can be considered part of a pull technique for receiving content. It should be understood, however, that the piece(s) of protected content can alternatively be pushed to the destination. In such instances, the destination agent may not separately request the protected content from the source.

Upon receipt of the content request or at such other time as is desired, the source 102, or more particularly the source agent 108, can operate to send the protected content to the destination 104 in a number of different manners. For example, as shown in FIG. 9A, the source agent can pass the protected content to the authorizing entity, particularly when the source is configured to transmit the protected content to the destination across one or more networks (e.g., cellular network and/or data network). In this regard, in such instances, the authorizing entity can comprise a gateway (e.g., GTW 18, GGSN 28, etc.) along the network path from the source to the destination. In contrast, as shown in FIG. 9B, the source agent can send a request to the authorizing entity to verify the access rights of the source and/or destination (and/ or a terminal 10 requesting that the content be forwarded from the source to the destination) with respect to the protected content, such as when the source is configured to transmit the protected content directly to the destination (e.g., RF, BT, IrDA, etc.).

Irrespective of whether the source agent 108 transmits the protected content to the authorizing entity (e.g., GTW 18, GGSN 28, etc.), or the source agent requests access rights verification from the authorizing entity, the authorizing entity can determine, from the digital rights service group identifiers and supplemental group identifiers associated with the respective source 102 and destination 104, if the source and/ or destination agent have access rights to the respective piece (s) of protected content. In this regard, as indicated above, when the source or destination comprises a terminal 10 (or a terminal is directing the transfer of content), the identifiers can be permanently stored along with subscriber data for the terminals in a HLR 19 of the system, and can be temporarily stored in the VLR in the area of which the respective terminals are located at a given moment, as shown in FIG. 1. Thus, in such instances, the authorizing entity can communicate with the HLR/VLR to retrieve the respective identifiers. Thereafter, the authorizing entity can verify if the source and/or destination (or terminal directing the transfer has access rights to the protected content based upon the respective identifiers and the piece(s) of protected content.

If the authorizing entity (e.g., GTW 18, GGSN 28, etc.) fails to verify that either the source 102 or destination 104 (or terminal 10 directing the transfer) has access rights to the protected content, the authorizing entity can prevent the content transfer. In the instance of FIG. 9A, for example, the authorizing entity can refrain from transferring the protected content to the destination and can, if so desired, inform the source and/or destination that the authorizing entity failed to verify access rights to the protected content. In contrast, in the instance of FIG. 9B, the authorizing entity can inform the source agent 108 that the authorizing entity failed to verify access rights to the protected content such that the source can refrain from transferring the protected content to the destination.

On the other hand, if the authorizing entity successfully verifies access to the protected content for the source 102 or destination 104 (or terminal 10 directing the transfer), the authorizing entity can permit the content transfer. For example, as shown in FIG. 9A, the authorizing entity can transfer the protected content to the destination and can, if so desired, inform the source that the authorizing entity successfully transferred the protected content. Alternatively, for example, the authorizing entity can inform the source agent 108 that the authorizing entity successfully verified access rights to the protected content such that the source can transfer the protected content to the destination, as shown in the instance of FIG. 9B.

Irrespective of whether the authorizing entity (e.g., GTW 18, GGSN 28, etc.) or the source agent 108 transfers the protected content to the destination, the authorizing entity or another entity (e.g., origin server 23) in communication with the authorizing entity, can monitor the transfer of each piece of protected content. The authorizing entity or other entity can then determine a frequency of transferring the respective piece of content from sources 102 to destinations 104. As such, the authorizing entity or other entity can facilitate compensating the creators of the transferred content based upon the transfer and/or the transfer frequency.

As explained above, the authorizing entity (e.g., GTW 18, GGSN 28, etc.) can verify access rights to the protected content by verifying that the source or destination (or terminal 10 directing the transfer) has access rights to the protected content. It should be understood, however, that verifying access rights to the protected content may require that a specific one of the source or destination (or terminal) have access rights to the protected content, if so desired. Alternatively, verifying access rights to the protected content may require that both the source and destination (and terminal) have access rights to the protected content.

As also explained above, in implementing the DRM technique of embodiments of the present invention, the authorizing entity can comprise, for example, a gateway (e.g., GTW 18, GGSN 28, etc.). It should be understood, however, that the authorizing entity can alternatively comprise any of a number of other entities capable of verifying the access rights of the source 102 and/or destination 104 (or terminal 10 directing the transfer) to protected content. For example, the authorizing entity can comprise the source or destination, or more particularly the source agent 108 or destination agent 110, if so desired.

According to one aspect of the present invention, all or a portion of the system of the present invention, such all or portions of the terminal 10, source 102 (e.g., terminal, service provider 22, origin server 23, user processor 31, portable electronic device 33, digital broadcast receiver 36, digital broadcaster 32, etc.) and/or destination 104 (e.g., terminal, service provider, origin server, user processor, portable electronic device, digital broadcast receiver, digital broadcaster, etc.), generally operates under control of a computer program product (e.g., client agent 106, source agent 108, destination agent 110, etc.). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 7, 8A, 8B, 9A and 9B are control flow diagrams of methods, systems and program products according to the invention. It will be understood that each block or step of the control flow diagrams, and combinations of blocks in the control flow diagrams, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the control flow diagrams. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the control flow diagrams. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the control flow diagrams.

Accordingly, blocks or steps of the control flow diagrams support combinations of means for performing the specified functions, combinations of steps for performing the specified functions and program instruction means for performing the specified functions. It will also be understood that each block or step of the control flow diagrams, and combinations of blocks or steps in the control flow diagrams, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
a processor configured to provide a digital rights service group for a group of entities including at least one of a source or a destination, the digital rights service group defining a level of access of the source or destination to protected content, wherein the processor being configured to provide the digital rights service group includes being configured to provide the digital rights service group defining access to unspecified protected content available from a specified content origin, and provide another digital rights service group defining access to a specified piece of content available from an unspecified content origin, the unspecified content origin being the same or a different content origin,
wherein the processor is configured to associate the source or destination with a digital rights service group identifier that identifies the digital rights service group, access rights of the source or destination to the protected content being verifiable based upon the digital rights service group identifier to thereby permit a transfer of the protected content from the source to the destination if the access rights of at least one of the source or destination are verified, wherein the processor being configured to associate the source or destination includes being configured to associate the source or destination, included within the digital rights service group defining access to the specified piece of content, with a supplemental group identifier, the access rights being verifiable based upon at least one of the digital rights service group identifier or the supplemental group identifier.

2. An apparatus according to claim 1, wherein the processor is further configured to direct storage of the digital rights service group identifier in at least one of a home location register (HLR) or a visitor location register (VLR) after defining the digital rights service group, a digital rights service group identifier being receivable from at least one of the HLR or VLR for verifying access rights based upon the received digital rights service group identifier and the protected content.

3. An apparatus according to claim 1, wherein the processor is further configured to verify access rights to protected content based upon the digital rights service group identifier and the protected content, and wherein the processor is configured to transfer the protected content to the destination if the access rights of at least one of the source or destination are verified.

4. An apparatus according to claim 3, wherein the processor is further configured to monitor the transfer of protected content from the source to the destination to thereby facilitate compensating at least one creator of the content based upon at least one of the transfer or a transfer frequency of the content.

5. A method of providing digital rights management of content, the method comprising:
providing a digital rights service group for a group of entities including at least one of a source or a destination, the digital rights service group defining a level of access of the source or destination to protected content, wherein providing the digital rights service group comprises providing the digital rights service group defining access to unspecified protected content available from a specified content origin, mad providing another digital rights service group defining access to a specified piece of content available from an unspecified content origin, the unspecified content origin being the same or a different content origin; and
associating the source or destination with a digital rights service group identifier that identifies the digital rights service group, access rights of the source or destination to the protected content being verifiable based upon the digital rights service group identifier to thereby permit a transfer of the protected content from the source to the destination if the access rights of at least one of the source or destination are verified, wherein associating the source or destination comprises associating the source or destination, included within the digital rights service group defining access to the specified piece of content, with a supplemental group identifier, the access rights being verifiable based upon at least one of the digital rights service group identifier or the supplemental group identifier.

6. A method according to claim 5 further comprising:
directing storage of the digital rights service group identifier in at least one of a home location register (HLR) or a visitor location register (VLR) after defining the digital rights service group, a digital rights service group identifier being receivable from at least one of the HLR or VLR for verifying access rights based upon the received digital rights service group identifier and the protected content.

7. A method according to claim 5 further comprising:
verifying access rights to protected content based upon the digital rights service group identifier and the protected content; and
transferring the protected content to the destination if the access rights of at least one of the source or destination are verified.

8. A method according to claim 7 further comprising:
monitoring the transfer of protected content from the source to the destination to thereby facilitate compensating at least one creator of the content based upon at least one of the transfer or a transfer frequency of the content.

9. A method of providing digital rights management of content, the method comprising:
providing a digital rights service group for a group of entities including at least one of an apparatus, a source or a destination, the digital rights service group defining a level of access of the source or destination to protected content;

associating at least one of the apparatus, the source or the destination with at least one digital rights service group identifier that identifies the digital rights service group, access rights of the source or destination to the protected content being verifiable based upon the digital rights service group identifier to thereby permit a transfer of the protected content from the source to the destination if the access rights of at least one of the source or destination are verified;

receiving a request to transfer content from the source to the destination, the request being received from the apparatus over a first path that extends through both a first network and a second network;

verifying the access rights to protected content based upon the digital rights service group identifier and the protected content; and transferring the protected content to the destination if the access rights of at least one of the source or destination are verified, wherein transferring the protected content comprises transferring the protected content from the source to the destination over a second path that extends through the second network but that does not extend through the first network if the access rights of at least one of the apparatus, source or destination are verified.

10. A method according to claim 9, wherein the apparatus is configured to receive protected content from the source over the first path that extends through both the first network and the second network, and wherein receiving a request comprises receiving a request to transfer the same protected content from the source to the destination.

11. A method according to claim 10 further comprising:
storing the protected content in a memory of the apparatus after receiving the content; and
removing the protected content from the memory after transferring the protected content from the source to the destination.

12. A method according to claim 9, wherein receiving a request further comprises receiving authorization information, and wherein the method further comprises:
verifying an identity of at least one of the apparatus or apparatus user based upon the authorization information before transferring the protected content.

13. A method according to claim 12, wherein receiving authorization information comprises receiving encrypted authorization information including a time stamp defining a period of time the authorization information is decryptable, and wherein the method further comprises:
decrypting the authorization information within the period of time defined by the time stamp before verifying the identity of at least one of the apparatus or apparatus user.

14. A computer program product for providing digital rights management of content, the computer program product comprising at least one computer-readable storage medium having computer-readable program code portions stored therein, the computer-readable program code portions comprising:
a first executable portion configured to provide a digital rights service group for a plurality of entities including at least one of a source or a destination, the digital rights service group defining a level of access of the source or destination to protected content, wherein the first executable portion being configured to provide the digital rights service group includes being configured to provide the digital rights service group defining access to unspecified protected content available from a specified content origin, and provide another digital rights service group defining access to a specified piece of content available from an unspecified content origin, the unspecified content origin being the same or a different content origin; and
a second executable portion configured to associate the source or destination with a digital rights service group identifier that identifies the digital rights service group, access rights of the source or destination to protected content being verifiable based upon the digital rights service group identifier to thereby permit a transfer of the protected content from the source to the destination if the access rights of at least one of the source or destination are verified, wherein the second executable portion being configured to associate the source or destination includes being configured to associate the source or destination, included within the digital rights service group defining access to a specified piece of content, with a supplemental group identifier, the access rights being verifiable based upon at least one of the digital rights service group identifier or the supplemental group identifier.

15. A computer program product according to claim 14, wherein the computer-readable program code portions further comprise:
a third executable portion configured to direct storage of the digital rights service group identifier in at least one of a home location register (HLR) or a visitor location register (VLR) after defining the digital rights service group, a digital rights service group identifier being receivable from at least one of the HLR or VLR for verifying access rights based upon the received digital rights service group identifier and the protected content.

16. A computer program product according to claim 14, wherein the computer-readable program code portions further comprise:
a third executable portion configured to verify access rights to protected content based upon the digital rights service group identifier and the protected content; and
a fourth executable portion configured to transfer the protected content to the destination if the access rights of at least one of the source or destination are verified.

17. A computer program product according to claim 16, wherein the computer-readable program code portions further comprise:
a fifth executable portion configured to monitor the transfer of protected content from the source to the destination to thereby facilitate compensating at least one creator of the content based upon at least one of the transfer or a transfer frequency of the content.

18. A computer program product for providing digital rights management of content, the computer program product comprising at least one computer-readable storage medium having computer-readable program code portions stored therein, the computer-readable program code portions comprising:
a first executable portion configured to provide a digital rights service group for a group of entities including at least one of an apparatus, a source or a destination, the digital rights service group defining a level of access of the source or destination to protected content:
a second executable portion configured to associate at least one of the apparatus, the source or the destination with at least one digital rights service group identifier that identifies the digital rights service group, access rights of the source or destination to the protected content being verifiable based upon the digital rights service group identifier to thereby permit a transfer of the protected content from the source to the destination if the access rights of at least one of the source or destination are verified;

a third executable potation configured to receive a request to transfer content from the source to the destination, the request being received from an apparatus over a first path that extends through both a first network and a second network;

a fourth executable portion configured to verify the access rights to protected content based upon the digital rights service group identifier and the protected content; and a fifth executable portion configured to transfer the protected content to the destination if the access rights of at least one of the source or destination are verified, wherein the fifth executable portion being configured to transfer the protected content includes being configured to transfer the protected content from the source to the destination over a second path that extends through the second network but that does not extend through the first network if the access rights of at least one of the apparatus, source or destination are verified.

19. A computer program product according to claim 18, wherein the apparatus is configured to receive protected content from the source over the first path that extends through both the first network and the second network, and wherein the third executable portion being configured to receive a request includes being configured to receive a request to transfer the same protected content from the source to the destination.

20. A computer program product according to claim 18, wherein the third executable portion being configured to receive a request further includes being configured to receive authorization information, and wherein the computer-readable program code portions further comprise:

a sixth executable portion configured to verify an identity of at least one of the apparatus or apparatus user based upon the authorization information before transferring the protected content.

21. A computer program product according to claim 20, wherein the third executable portion being configured to receive authorization information includes being configured to receive encrypted authorization information including a time stamp defining a period of time the authorization information is decryptable, and wherein the computer-readable program code portions further comprise:

a seventh executable portion configured to decrypt the authorization information within the period of time defined by the time stamp before verifying the identity of at least one of the apparatus or apparatus user.

22. An apparatus comprising:

a processor configured to provide a digital rights service group for group of entities including at least one of a terminal, a source or a destination, wherein the processor is configured to associate at least one of the terminal, the source or the destination with at least one digital rights service group identifier; and that identifies the digital rights service group, access rights of the source or destination to the protected content being verifiable based upon the digital rights service group identifier to thereby permit a transfer of the protected content from the source to the destination if the access rights of at least one of the source or destination are verified, wherein the processor is configured to receive a request to transfer content from the source to the destination, the request being received from a terminal over a first path that extends through both a first network mad a second network, wherein the processor is configured to verify the access rights to protected content based upon the digital rights service group identifier and the protected content, and wherein the processor is configured to transfer the protected content to the destination if the access rights of at least one of the source or destination are verified, wherein the processor being configured to transfer the protected content includes being configured to transfer the protected content from the source to the destination over a second path that extends through the second network but that does not extend through the first network if the access rights of at least one of the terminal, source or destination are verified.

23. An apparatus according to claim 22, wherein the terminal is configured to receive protected content from the source over the first path that extends through both the first network and the second network, and wherein the processor being configured to receive a request includes being configured to receive a request to transfer the same protected content from the source to the destination.

24. An apparatus according to claim 22, wherein the processor being configured to receive a request further includes being configured to receive authorization information, and wherein the processor is further configured to verify an identity of at least one of the terminal or terminal user based upon the authorization information before transferring the protected content.

25. An apparatus according to claim 24, wherein the processor being configured to receive authorization information includes being configured to receive encrypted authorization information including a time stamp defining a period of time the authorization information is decryptable, and wherein the processor is further configured to decrypt the authorization information within the period of time defined by the time stamp before verifying the identity of at least one of the terminal or terminal user.

* * * * *

UNITED STATES PATENT AND TRADEMARK OFFICE
CERTIFICATE OF CORRECTION

| | | |
|---|---|---|
| PATENT NO. | : 7,606,559 B2 | Page 1 of 1 |
| APPLICATION NO. | : 11/018618 | |
| DATED | : October 20, 2009 | |
| INVENTOR(S) | : Aarnio et al. | |

It is certified that error appears in the above-identified patent and that said Letters Patent is hereby corrected as shown below:

<u>Column 24,</u>
Line 18, "mad" should read --and--.

<u>Column 27,</u>
Line 3, "potation" should read --portion--;
Line 52, "for group" should read --for a group--.

<u>Column 28,</u>
Line 3, "group identifier; and that identifies" should read --group identifier that identifies--;
Line 13, "mad" should read --and--.

Signed and Sealed this
Twenty-fifth Day of January, 2011

David J. Kappos
*Director of the United States Patent and Trademark Office*